US009068506B2

(12) United States Patent
Eleftheriou et al.

(10) Patent No.: US 9,068,506 B2
(45) Date of Patent: Jun. 30, 2015

(54) TURBINE ENGINE HEAT RECUPERATOR SYSTEM

(75) Inventors: Andreas Eleftheriou, Woodbridge (CA); Daniel Alecu, Toronto (CA); David Menheere, Georgetown (CA)

(73) Assignee: PRATT & WHITNEY CANADA CORP., Longueuil, Quebec (CA)

( * ) Notice: Subject to any disclaimer, the term of this patent is extended or adjusted under 35 U.S.C. 154(b) by 652 days.

(21) Appl. No.: 13/435,051

(22) Filed: Mar. 30, 2012

(65) Prior Publication Data

US 2013/0255268 A1   Oct. 3, 2013

(51) Int. Cl.
| | | |
|---|---|---|
| *F02C 7/10* | (2006.01) | |
| *F02C 7/08* | (2006.01) | |
| *F01D 25/30* | (2006.01) | |

(52) U.S. Cl.
CPC . *F02C 7/08* (2013.01); *F01D 25/30* (2013.01); *F05D 2270/17* (2013.01)

(58) Field of Classification Search
CPC ............... F02C 7/08; F02C 7/10; F02C 6/18; F02C 9/18; F28D 7/0058
USPC .................... 60/782, 39.5, 39.511, 39.52, 266
See application file for complete search history.

(56) References Cited

U.S. PATENT DOCUMENTS

| | | | |
|---|---|---|---|
| 2,516,910 A | 8/1950 | Redding | |
| 2,713,245 A | 7/1955 | Weaving | |
| 2,895,294 A * | 7/1959 | Terrell | ............................. 60/792 |
| 2,914,917 A | 12/1959 | Van Nest | |
| 3,222,864 A | 12/1965 | Dyste et al. | |
| 3,267,673 A | 8/1966 | Hemsworth et al. | |
| 3,386,243 A | 6/1968 | Beam, Jr. et al. | |
| 3,584,459 A | 6/1971 | Amann | |
| 3,717,994 A | 2/1973 | Templin | |
| 5,105,617 A | 4/1992 | Malohn | |
| 5,212,942 A | 5/1993 | Malohn | |
| 5,380,151 A | 1/1995 | Kostka et al. | |
| 5,396,760 A | 3/1995 | Hines | |
| 5,845,482 A * | 12/1998 | Carscallen | ...................... 60/785 |
| 6,032,459 A | 3/2000 | Skowronski | |
| 6,092,361 A | 7/2000 | Romani | |
| 6,463,730 B1 | 10/2002 | Keller et al. | |
| 6,513,318 B1 | 2/2003 | Wright | |
| 6,848,259 B2 | 2/2005 | Kelller-Sornig et al. | |

(Continued)

FOREIGN PATENT DOCUMENTS

GB    1000767    8/1965

OTHER PUBLICATIONS

Extended European Search Report dated Jul. 22, 2013 issued for Applicant's corresponding European Patent Application No. 13161279.8-1610.

*Primary Examiner* — Phutthiwat Wongwian
*Assistant Examiner* — Steven Sutherland
(74) *Attorney, Agent, or Firm* — Norton Rose Fulbright Canada LLP (57) ABSTRACT

A gas turbine engine recuperator system includes a heat recuperator positioned in a gas turbine exhaust gas duct for recovering heat from turbine exhaust gases to preheat a compressor flow being supplied to the combustor. A continuous bleed flow of the turbine exhaust gases is provided to bypass the heat recuperator. The continuous bleed flow of the turbine exhaust gases is adjustable to reduce turbine exhaust gas pressure loss at a high engine operation level and to provide efficient heat recovery at low and/or medium engine operation levels.

15 Claims, 5 Drawing Sheets

(56) References Cited

U.S. PATENT DOCUMENTS

| | | |
|---|---|---|
| 6,971,227 B2 | 12/2005 | Dolak et al. |
| 7,007,487 B2 | 3/2006 | Belokon et al. |
| 2004/0098965 A1* | 5/2004 | Dettmer ............... 60/39.511 |
| 2005/0235627 A1 | 10/2005 | Vadermolen |

* cited by examiner

TURBINE ENGINE HEAT RECUPERATOR SYSTEM

TECHNICAL FIELD

The described subject matter relates generally to gas turbine engines, and more particularly to a turbine engine heat recuperator system of a gas turbine engine.

BACKGROUND OF THE ART

Gas turbine engines with heat exchange recuperators are well known in the prior art. A recuperator is a heat exchanger which utilizes hot exhaust gases from the engine to heat the compressed air input from the compressor, prior to injection of the compressed air into the combustion chamber. Preheating the compressed air improves fuel efficiency of the engine in a number of ways. Some of the heat from the turbine exhaust gases is transferred to the compressed air for combustion, which affects the temperature and velocity of the gases flowing from the discharge nozzle. A turbo jet engine equipped with a recuperator is thus adapted to combine improved efficiency with lowered jet velocity. A reduction in jet velocity can be expected to be accompanied by a corresponding reduction in propulsive thrust. Therefore, efforts have been made to improve turbine engine heat recuperator systems to meet different requirements in thermal efficiency and low pressure loss of exhaust gases during engine operation.

Accordingly, there is a need to provide an improved turbine engine heat recuperator system of a gas turbine engine.

SUMMARY

In one aspect, the described subject matter provides a turbine engine heat recuperator system comprising: a heat recuperator including first and second fluid passages configured for heat exchanges between fluid flowing through the respective first and second passages, the first passage of the heat recuperator being connected to and forming part of a compressor air passage to allow a compressor air flow to pass through the first passage of the heat recuperator and to then enter a combustor, the heat recuperator being disposed in an engine exhaust duct to allow exhaust gases discharged from a turbine to pass through the second passage of the heat recuperator and to then be discharged from the exhaust duct; a diffuser disposed between the turbine and the heat recuperator, the diffuser forming part of the exhaust duct to allow the exhaust gases to flow therethrough, the diffuser having a boundary wall defining a plurality of holes for continuously bleeding a boundary layer of the exhaust gases flowing through the diffuser; a valve device for adjusting a continuous bleed flow of the exhaust gases bled from the holes of the boundary wall of the diffuser; and a secondary passage for directing the adjusted continuous bleed flow of the exhaust gasses into the exhaust duct downstream of the heat recuperator, to thereby bypass the heat recuperator.

In another aspect, the described subject matter provides a gas turbine engine having a rotational axis, the engine comprising: an annular compressor assembly disposed about the rotational axis; an annular turbine assembly disposed about the rotational axis; an annular combustion gas generator assembly disposed about the rotational axis; and a heat recuperator system including: a heat recuperator including first and second fluid passages configured for heat exchanges between fluid flowing through the respective first and second passages, the first passage of the heat recuperator being connected to and forming part of compressor air passage to allow a compressor air flow from the annular compressor assembly to pass through the first passage of the heat recuperator and to then enter the annular combustion gas generator assembly, the heat recuperator being disposed in an annular exhaust duct to allow exhaust gases discharged from the annular turbine assembly to pass through the second passage of the heat recuperator and to then be discharged from the annular exhaust duct; an annular diffuser disposed between the annular turbine assembly and the heat recuperator, the annular diffuser forming part of the annular exhaust duct to direct the exhaust gases from the annular turbine assembly to flow therethrough and to the heat recuperator, the annular diffuser having an annular boundary wall defining a plurality of holes extending therethrough for continuously bleeding a boundary layer of the exhaust gases flowing through the diffuser; a valve device for adjusting a continuous bleed flow of the exhaust gases bled from the holes of the boundary wall of the diffuser; and a secondary passage for directing the adjusted continuous bleed flow of the exhaust gasses into the exhaust duct downstream of the heat recuperator.

In a further aspect, the described subject matter provides a method for recuperating heat from exhaust gases discharged from a gas turbine engine, the method comprising: a) directing a compressor air flow through a heat exchanger disposed in a exhaust duct of the engine, to a combustor of the engine; b) directing turbine exhaust gases through a diffuser disposed upstream of the heat exchanger and forming part of the exhaust duct, to thereby reduce a velocity of the turbine gases before the turbine gases pass though the heat exchanger; c) directing a main flow of the exhaust gases from the diffuser to pass through the heat exchanger and then discharging the main flow of the exhaust gases from the exhaust duct to atmosphere, thereby heating the compressor air flow passing through the heat exchanger; d) continuously bleeding a boundary layer of the turbine exhaust gases passing through the diffuser to form a continuous flow of the turbine exhaust gases, and directing the continuous flow of the turbine exhaust gases to bypass the heat exchanger and to enter the exhaust duct downstream of the heat exchanger; and e) controlling the continuous flow of the turbine exhaust gasses to bypass the heat exchanger to allow a low bleed rate when the engine is operated at low and medium power levels to provide effective heat recuperation, and to allow a high bleed rate when the engine is operated at a high power level to reduce pressure loss of the turbine exhaust gases.

Further details of these and other aspects of the described subject matter will be apparent from the detailed description and drawings included below.

BRIEF DESCRIPTION OF THE DRAWINGS

Reference is now made to the accompanying drawings depicting aspects of the described subject matter, in which.

It will be noted that throughout the appended drawings, like features are identified by like reference numerals.

DETAILED DESCRIPTION

Figure 1:
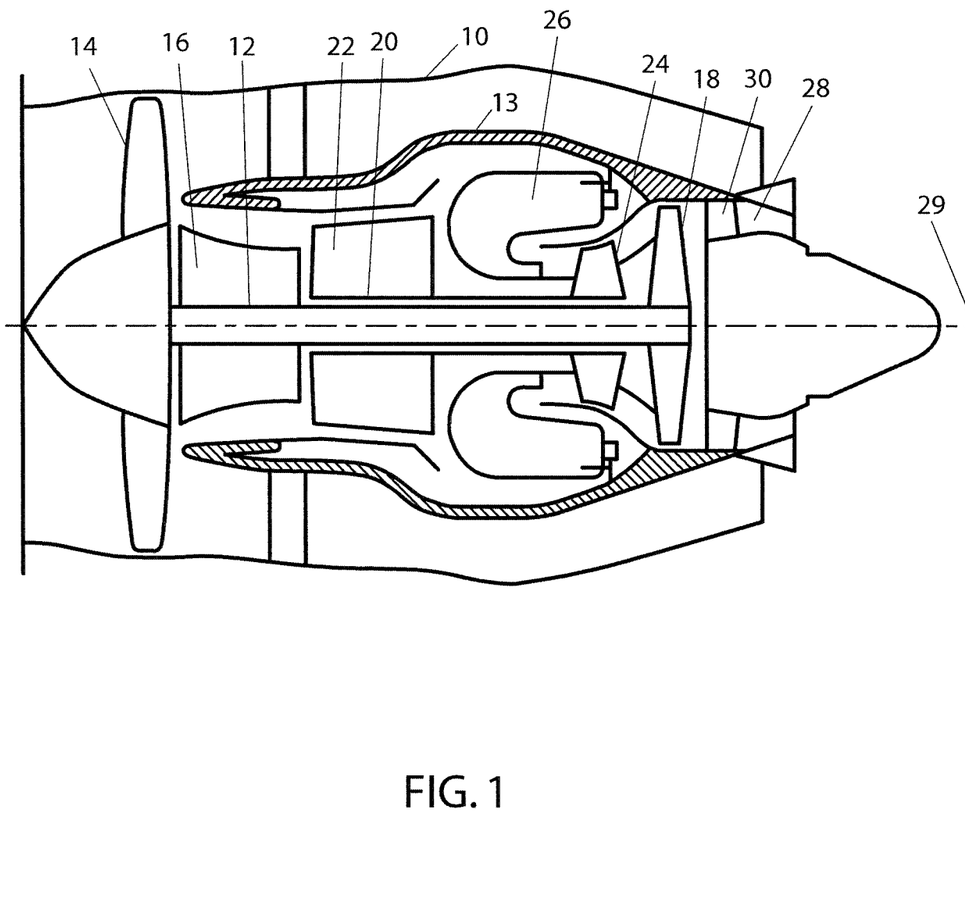
FIG. 1 is a schematic cross-sectional view of a turbofan gas turbine engine illustrating an exemplary application of the described subject matter.

FIG. 1 illustrates a turbofan gas turbine aircraft engine as an example of the application of the described subject matter includes a housing or nacelle annular outer case 10, an annular core casing 13, a low pressure spool assembly (not numbered) which includes a fan assembly 14, a low pressure compressor assembly 16 and a low pressure turbine assembly 18 connected together by a shaft 12, and a high pressure spool assembly (not numbered) which includes a high pressure compressor assembly 22 and a high pressure turbine assembly 24 connected together by a hollow shaft 20 which is positioned coaxially around the shaft 12. The core casing 13 surrounds the low and high pressure spool assemblies in order to define a main fluid path (not numbered) therethrough. In the main fluid path there is provided an annular combustor 26 to constitute a gas generator section. An annular exhaust duct 28 is provided to form a downstream end of the main fluid path. The engine defines a rotational axis 29 and all the above described components and assemblies are disposed about the rotational axis 29.

Referring to FIGS. 1-5, a turbine engine heat recuperator system 30 is provided for recovering heat energy from turbine exhaust gases 48, for preheating compressor air being supplied to the combustor 26 for combustion. According to one embodiment, the turbine engine heat recuperator system 30 may include a heat recuperator 32 which is a heat exchanger for example of a double-pass cross-flow plate type, disposed in the annular exhaust duct 28. The heat recuperator 32 includes a plurality of plates (not numbered) stacked on the circumference of the plenum of the annular exhaust duct 28 and held together like staves in a barrel. The heat recuperator 32 includes a first air passage schematically shown by broken line 34, which extends through and is connected to the stacked plates. The first air passage 34 has inlets 36 connected through an outer manifold 38 to the engine compressor diffuser exit (not numbered) and has outlets 40 connected through an inner manifold 42 to the combustor inlet (not numbered), to thus form part of a compressor passage (not numbered). Therefore, a compressor air flow 44 is directed through the first passage 34 of the heat recuperator 32 before entering the combustor 26 for combustion. Spaces between the stacked plates define a second air passage 46 through which the hot exhaust gases indicated by arrows 48, are directed and thereby wash the plates. The heat transferred from the hot exhaust gases 48 through the plates, heats the compressor air flow 44 which is directed through the first air passage 34. The preheated compressor air flow 44 exists the heat recuperator 32 and then enters the combustor 26 where more heat is added by the combustion reaction before the combustion gases (not numbered) are expanded in the turbine assemblies 24 and 18.

Figure 2:
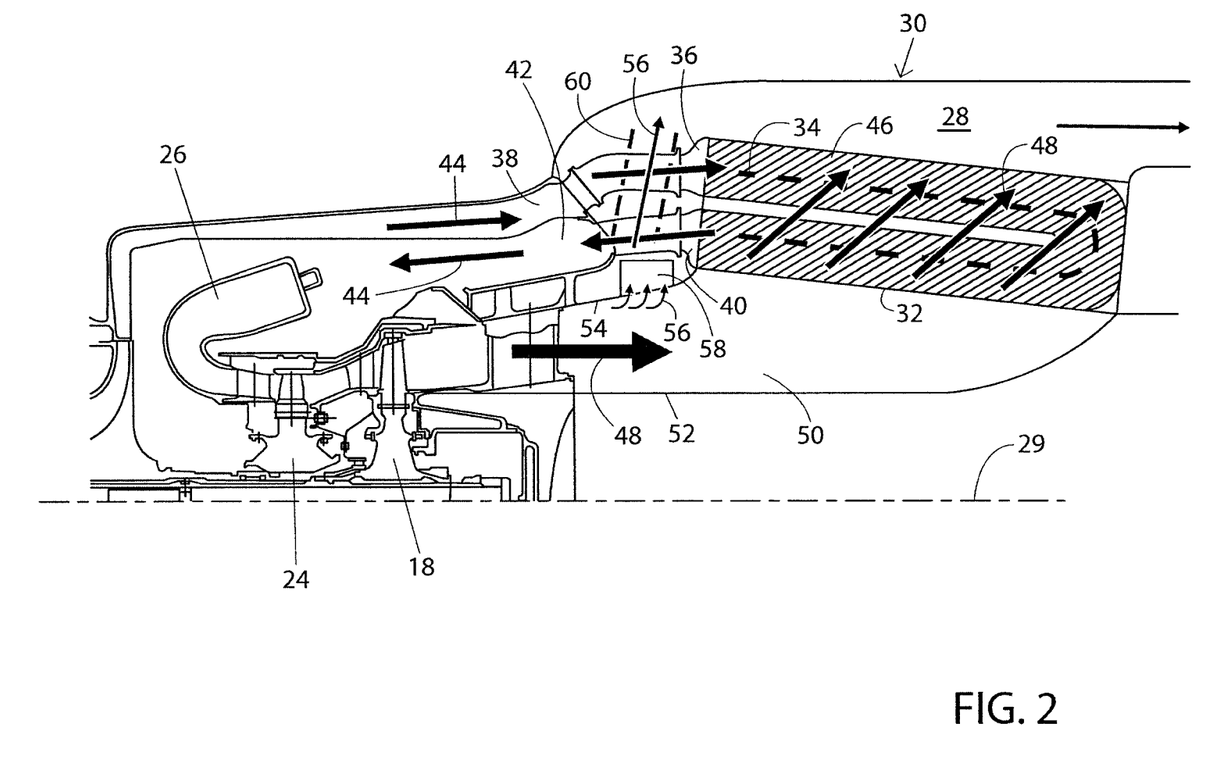
FIG. 2 is a partial cross-sectional view of the engine of FIG. 1, showing a turbine engine heat recuperator system operated for engine operation in low and medium power levels.
Figure 3:
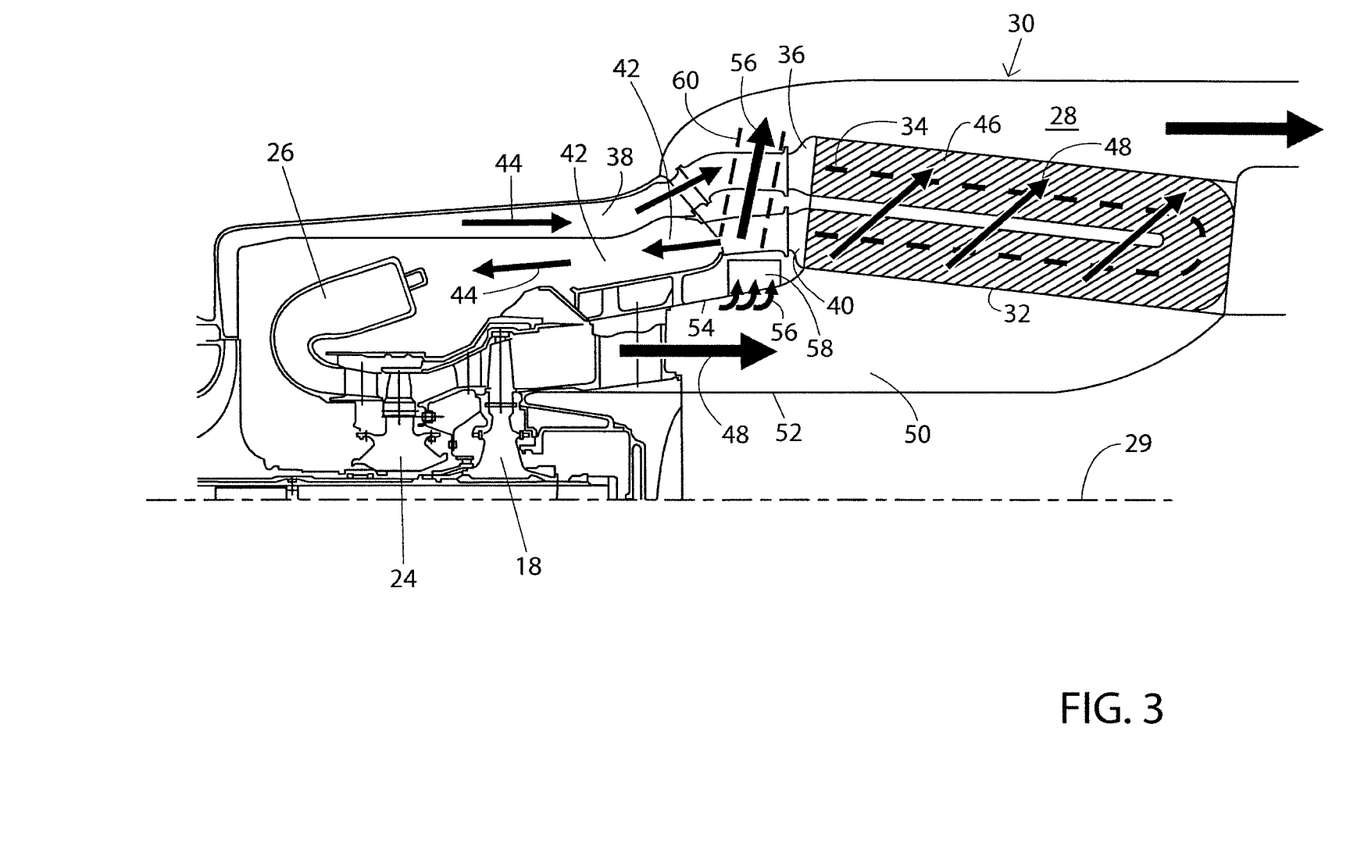
FIG. 3 is a partial cross-sectional view of the engine of FIG. 1, showing the turbine engine heat recuperator system operated in a condition for engine operation in a high power level.

An annular diffuser 50 is disposed downstream of the low pressure turbine assembly 18, between the low pressure turbine assembly 18 and the heat recuperator 32, forming part of the annular exhaust duct 28. The annular diffuser 50 has radially spaced annular inner and outer boundary walls 52, 54 disposed about the rotational axis 29 such that the annular diffuser 50 defines an annular passage (not numbered) having a cross-sectional area gradually increasing from the upstream end to the downstream end thereof, for reducing the velocity of the hot exhaust gases 48 discharged from the low pressure turbine assembly 18 and before the hot exhaust gases 48 enter the heat recuperator 32. The outer boundary wall 54 defines a plurality of holes (not numbered) for continuously bleeding a boundary layer of the hot exhaust gases 48 flowing through the diffuser 50. The continuous bleed flow is indicated by arrows 56. A valve device 58 is provided for adjusting the continuous bleed flow 56 of the exhaust gases 48, which will be further described hereinafter.

A secondary passage indicated by two parallel broken lines 60, is configured within the annular exhaust duct 28 to bypass the heat recuperator 32. The secondary passage 60 is positioned outside of the annular diffuser 50 and is in fluid communication with the valve device 58, for directing the continuous bleed flow 56 of the exhaust gases 48 which has been adjusted by the valve 58, into the exhaust duct 28 downstream of the heat recuperator 32. It should be noted that the secondary passage 60 shown by the parallel broken lines is a schematic illustration of the passage, showing the function thereof, and is not related to any particular configuration. The secondary passage 60 may be provided in various configurations to fit in the various configurations of the annular exhaust duct 28 and the recuperator 32.

Figure 4:
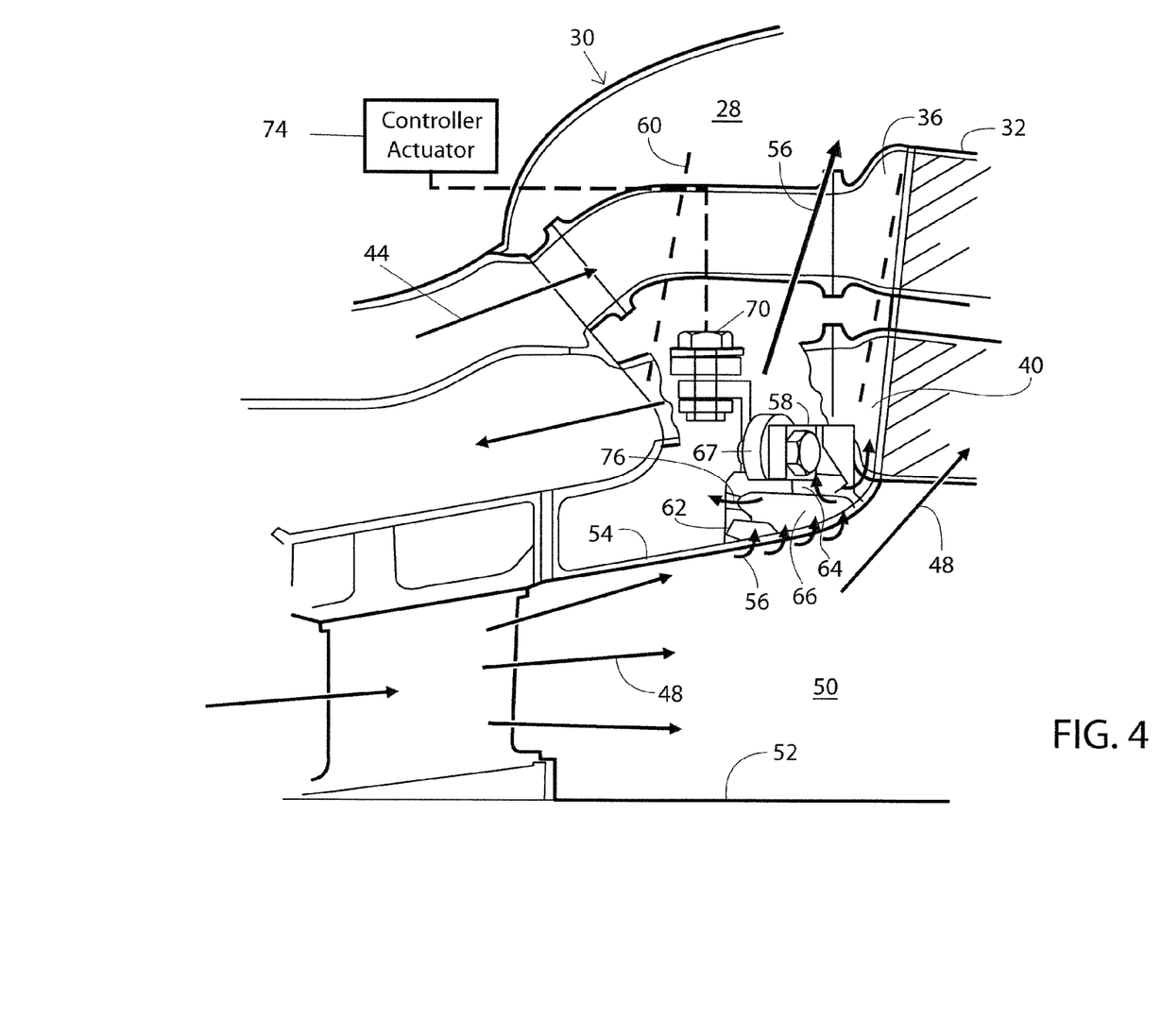
FIG. 4 is a partial cross-sectional view of the engine of FIG. 1 showing a controlling apparatus for controlling a bleeding flow of a boundary layer of turbine exhaust gases in an enlarged scale.
Figure 5:
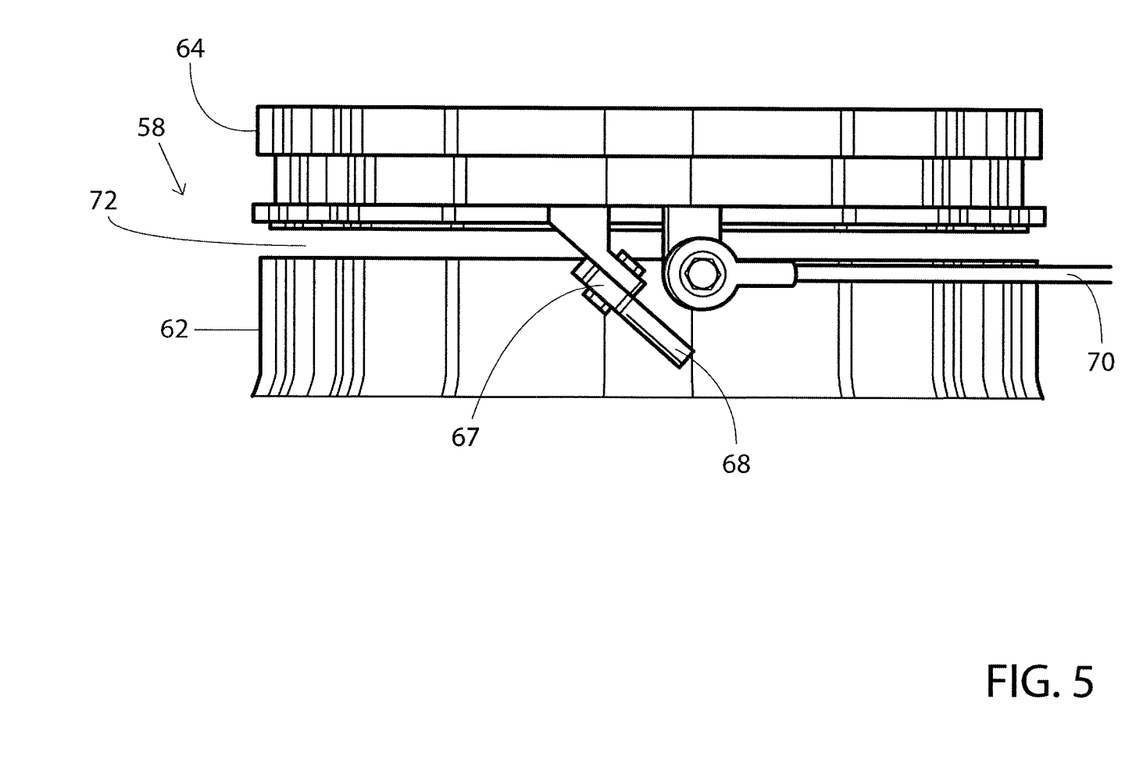
FIG. 5 is a side elevational view of a shroud valve used in the turbine engine heat exhaust recuperator system according to one embodiment.

In one embodiment, the valve device 58 which is more clearly shown in FIGS. 4 and 5, may be a type of a shroud valve which is mounted around the annular outer boundary wall 54.

The valve device 58 of the shroud valve type may include a stationary ring 62 and a sliding ring 64 axially movable from the stationary ring 62. The stationary ring 62 and the sliding ring 64 are positioned around the outer annular boundary wall 54 substantially aligning with the plurality of holes for the bleed flow 56, and in combination form an annular cavity 66 about the rotational axis 29 of the engine and are in fluid communication with the diffuser 50 through the holes for the continuous bleed flow 56 defined in the outer annular boundary wall 54. The sliding ring 64 has rollers 67 (only one shown in FIG. 5) which can roll on respective grooves 68 on an outer surface the stationary ring 62 when the sliding ring 64 is actuated by an actuation rod 70 attached to the side of the sliding ring 64, moving toward or away from the stationary ring 62, thereby creating an adjustable annular opening 72 between the stationary ring 62 and the sliding ring 64. The actuation rod 70 is connected to a controller/actuator 74 which controls the operation of the sliding ring 64 such that the annular opening 72 can be adjusted in width or may be completely closed. The valve device 58 of the shroud valve type may have a similar configuration as described in U.S. Pat. No. 5,380,151 which is incorporated by reference herein and will not be further described in detail. The annular cavity 66 defined between the outer annular boundary wall 54 of the diffuser 50 and the stationary and sliding rings 62, 64, is in fluid communication with the secondary passage 60 through the adjustable annular opening 72 between the stationary ring 62 and the sliding ring 64, such that the continuous bleed flow 56 of the turbine exhaust gases 48 which bleeds from the diffuser 50 to bypass the heat recuperator 32 by flowing through the valve device 58 and the secondary passage 60, is adjustable.

It is desirable to have the bleed flow 56 of the turbine exhaust gases 48 which bypasses the heat recuperator 32, adjusted to control a bypass flow rate of the turbine exhaust gases 48 with respect to the heat recuperator 32. It is also desirable to have the bleed flow 56 of the turbine exhaust gases 48 which bypasses the heat recuperator 32, be continuous and not completely blocked by the valve device 58. In one embodiment, one or more dedicated leakage holes 76 (see FIG. 4) through the valve device 58 may be provided, for example in either stationary or sliding ring 62, 64. Therefore, the dedicated leakage hole or holes 76 will provide an at-all-times open leakage passage to allow the continuous bleed flow 56 of the turbine exhaust gases 48 to enter the secondary passage 60 regardless of operation of the valve device 58.

In another embodiment, the sliding ring 64 may be configured to be slidable toward the stationary ring 62 but never in direct contact with the stationary ring 62. Therefore, the annular opening 72 between the stationary ring 62 and the sliding ring 64 will never be completely closed, thereby allowing continuous bleed flow 56 of the turbine exhaust gases 48 to always pass therethrough. Therefore, the annular opening 72 between the stationary and sliding rings 62, 64 may also form an at-all-times open leakage passage while being adjustable to control the flow rate of the continuous bleed flow 56 of the turbine exhaust gases 48. The valve device 58 according to this embodiment, may tolerate a relatively large amount of leakage which prevents valve wear due to rubbing between the stationary and sliding rings caused by engine vibration, which makes the valve device 58 robust as well as making valve fabrication less demanding.

The continuous bleed flow 56 of the turbine exhaust gases 48 in a moderate amount, is desirable in this embodiment because it creates a boundary layer suction in the diffuser 50, which improves pressure recovery of the turbine exhaust gases 48 in the relatively short diffuser 50 and therefore, improves the overall efficiency of the system.

In operation, the compressor air flow 44 is directed through the first air passage 34 of the heat recuperator 32 in which the compressor air flow 44 is heated by the turbine exhaust gases 48 passing through the second passage 46 of the heat recuperator 32, before entering the combustor 26. In addition to other conditions, the amount of heat transferred from the turbine gas exhaust gases 48 to the compressor air flow 44 in the heat recuperator 32, depends on the amount of turbine exhaust gases 48 passing through the second passage 46 of the heat recuperator 32. The amount of turbine exhaust gases 48 passing through the second passage 46 of the heat recuperator 32 in turn depends on the amount of continuous bleed flow 56 of the boundary layer of the turbine exhaust gases 48, which bypasses the heat recuperator 32 through the secondary passage 60 and therefore, does not participate in any heat exchange occurring within the heat recuperator 32.

The valve device 58 may be operated to control the continuous bleed flow 56 of the turbine exhaust gases 48 to bypass the heat recuperator 32 at a relatively low bleed rate (for example, the annular opening 72 between the stationary ring 62 and the sliding ring 64 may be adjusted to be relatively narrow) when the engine is operated at low and/or medium power levels in order to provide a relatively large amount of turbine exhaust gases 48 to pass through the heat recuperator 32, resulting in more effective heat recuperation. When the engine is operated at a high power level, the valve device 58 is adjusted to allow the continuous bleed flow 56 of the turbine exhaust gases 48 at a relatively high bleed rate (for example, the annular opening 72 between the stationary ring 62 and the sliding ring 64 is adjusted to be relatively wide) such that a reduced amount of the turbine exhaust gases 48 passing through the second passage 46 of the heat recuperator 32 is provided, resulting in reduction of pressure loss of the turbine exhaust gases 48 passing through the second passage 46 of the heat recuperator 32. At low and medium power levels, the turbine exhaust gases 48 have relatively low velocity, which results in low pressure loss in the diffuser 50 and recuperator 32. The high pressure hot turbine gases 48 passing through the recuperator 32 ensure good heat recuperation and reduced heat reduction at low and medium power levels in engine operation. At a higher engine operation level, the turbine exhaust gases 48 have the high velocity and the increased continuous bleed flow 56 increases the effective diffuser area ratio, thus providing a high ram pressure recovery rate upstream of the heat recuperator 32 for the exhaust gases 48 and allowing a low velocity of the turbine exhaust gases 48 to pass through the recuperator 32.

The secondary passage 60 has a fluid flow resistance less than the fluid flow resistance of the second passage 46 of the heat recuperator 32 and thus provides a relatively low pressure loss routine for the continuous bleed flow 56 to bypass the heat recuperator 32. The increased continuous bleed flow 56 bypassing the heat recuperator 32 reduces heat recuperation which increases fuel consumption. However, the resultant low pressure loss downstream of the low pressure turbine assembly 18 allows the maximum power to be provided.

Failure of the valve device 56 in any intermediate position may increase fuel consumption but will not affect other engine performance parameters. Failure of the valve device 56 in a minimum opened position may affect the maximum power only under extremely hot ambient conditions.

The heat recuperator system 30 according to this embodiment, provides reduced exhaust pressure loss at both high and medium power levels while providing maximum heat recuperation at the medium power level, as well as allowing the use of a short height area ratio diffuser, which results in a compact and light recuperator system 30. The continuous bleed flow 56 at any power level allows the use of a non-contact valve 56.

The above description is meant to be exemplary only, and one skilled in the art will recognize that changes may be made to the embodiments described without departure from the scope of the described subject matter. For example, the heat recuperator described in the embodiment may be replaced with heat exchangers of any other type suitable for the exhaust ducts of gas turbine engines. The shroud valve described according to the embodiment may also be replaced by a valve device of other types suitable for controlling bleed flow from a diffuser. A turbofan gas turbine aircraft engine is described as an example of the application of a turbine engine heat recuperator system, however, the described turbine engine heat recuperator system may be applicable to gas turbine aircraft engines of other types. Still other modifications which fall within the scope of the described subject matter will be apparent to those skilled in the art, in light of a review of this disclosure, and such modifications are intended to fall within the appended claims.

The invention claimed is:

1. A turbine engine heat recuperator system comprising:
a heat recuperator including first and second fluid passages configured for heat exchanges between fluid flowing through the respective first and second passages, the first passage of the heat recuperator being connected to and forming part of a compressor air passage to allow a compressor air flow to pass through the first passage of the heat recuperator and to then enter a combustor, the heat recuperator being disposed in an engine exhaust duct to allow exhaust gases discharged from a turbine to pass through the second passage of the heat recuperator and to then be discharged from the exhaust duct;
a diffuser disposed between the turbine and the heat recuperator, the diffuser forming part of the exhaust duct to allow the exhaust gases to flow therethrough, the diffuser having a boundary wall defining a plurality of holes for continuously bleeding a boundary layer of the exhaust gases flowing through the diffuser;

a valve device for adjusting a continuous bleed flow of the exhaust gases bled from the holes of the boundary wall of the diffuser; and a secondary passage for directing the adjusted continuous bleed flow of the exhaust gasses into the exhaust duct downstream of the heat recuperator, to thereby bypass the heat recuperator.

2. The turbine engine heat recuperator system as defined in claim 1 wherein the valve device comprises an at-all-times open leakage passage for a minimum bleed flow rate of the continuous bleed flow when a moveable valve member is in a closed position.

3. The turbine engine heat recuperator system as defined in claim 1 wherein the valve device comprises a valve member moveable only between a first open position and a second open position, the valve device allowing a first bleed flow rate when the valve member is in the first open position and the valve device allowing a second bleed flow rate when the valve member is in the second open position, the second bleed flow rate being greater than the first bleed flow rate.

4. The turbine engine heat recuperator system as defined in claim 1 wherein the secondary passage is configured to have a fluid flow resistance smaller than a fluid flow resistance of the second passage of the heat recuperator.

5. A gas turbine engine having a rotational axis, the engine comprising:
  an annular compressor assembly disposed about the rotational axis;
  an annular turbine assembly disposed about the rotational axis;
  an annular combustion gas generator assembly disposed about the rotational axis; and
  a heat recuperator system including:
  a heat recuperator including first and second fluid passages configured for heat exchanges between fluid flowing through the respective first and second passages, the first passage of the heat recuperator being connected to and forming part of compressor air passage to allow a compressor air flow from the annular compressor assembly to pass through the first passage of the heat recuperator and to then enter the annular combustion gas generator assembly, the heat recuperator being disposed in an annular exhaust duct to allow exhaust gases discharged from the annular turbine assembly to pass through the second passage of the heat recuperator and to then be discharged from the annular exhaust duct;
  an annular diffuser disposed between the annular turbine assembly and the heat recuperator, the annular diffuser forming part of the annular exhaust duct to direct the exhaust gases from the annular turbine assembly to flow therethrough and to the heat recuperator, the annular diffuser having an annular boundary wall defining a plurality of holes extending therethrough for continuously bleeding a boundary layer of the exhaust gases flowing through the diffuser;
  a valve device for adjusting a continuous bleed flow of the exhaust gases bled from the holes of the boundary wall of the diffuser; and
  a secondary passage for directing the adjusted continuous bleed flow of the exhaust gasses into the exhaust duct downstream of the heat recuperator.

6. The gas turbine engine as defined in claim 5 wherein the valve device is mounted around the annular boundary wall of the diffuser, forming an annular cavity about the rotational axis in fluid communication with the diffuser through the holes in the boundary wall, the valve device having a moveable valve member for controlling an opening of the annular cavity, the opening being in fluid communication with the annular cavity and the secondary passage.

7. The gas turbine engine as defined in claim 6 wherein the annular cavity comprises an at-all-times open leakage passage to allow the continuous bleed flow to enter the secondary passage, independent from operation of the valve device.

8. The gas turbine engine as defined in claim 5 wherein the valve device comprises a shroud valve mounted around the annular boundary wall of the diffuser, thereby forming an annular cavity radially positioned between the shroud valve and the annular boundary wall, the annular cavity being in fluid communication with the diffuser through the holes in the boundary wall.

9. The gas turbine engine as defined in claim 8 wherein the shroud valve comprises a stationary ring and a sliding ring axially moveable from the stationary ring to form an opening therebetween, the opening being in fluid communication with the annular cavity and the secondary passage.

10. The gas turbine engine as defined in claim 5 comprising a controller controlling the valve assembly in operation to allow the bleed flow of the exhaust gases at a first rate when the engine is operated under low and medium power and to allow the bleed flow of the exhaust gases at a second rate when the engine is operated under high power, the second rate being greater than the first rate.

11. The gas turbine engine as defined in claim 5 wherein the holes for continuously bleeding a boundary layer of the exhaust gases flowing through the diffuser, are defined in an annular outer wall of the annular diffuser.

12. The gas turbine engine as defined in claim 5 wherein the secondary passage is configured to have a fluid flow resistance smaller than a fluid flow resistance of the second passage of the heat recuperator.

13. A method for recuperating heat from exhaust gases discharged from a gas turbine engine, the method comprising:
  a) directing a compressor air flow through a heat exchanger disposed in a an exhaust duct of the engine, to a combustor of the engine;
  b) directing turbine exhaust gases through a diffuser disposed upstream of the heat exchanger and forming part of the exhaust duct, to thereby reduce a velocity of the turbine gases before the turbine gases pass though the heat exchanger;
  c) directing a main flow of the exhaust gases from the diffuser to pass through the heat exchanger and then discharging the main flow of the exhaust gases from the exhaust duct to atmosphere, thereby heating the compressor air flow passing through the heat exchanger;
  d) continuously bleeding a boundary layer of the turbine exhaust gases passing through a plurality of holes in a boundary wall of the diffuser to form a continuous flow of the turbine exhaust gases, and directing the continuous flow of the turbine exhaust gases to bypass the heat exchanger and to enter the exhaust duct downstream of the heat exchanger; and
  e) using a device for controlling the continuous bleed flow of the turbine exhaust gasses to bypass the heat exchanger to allow a low bleed rate when the engine is operated at low and medium power levels to provide effective heat recuperation, and to allow a high bleed rate when the engine is operated at a high power level to reduce pressure loss of the turbine exhaust gases.

14. The method as defined in claim 13 wherein step (e) is conducted by using a shroud valve mounted around the diffuser.

15. The method as defined in claim 13 wherein the continuous bleeding of the boundary layer of the turbine gases passing through the diffuser, is performed by an at-all-times open leakage passage defined in said device for controlling the continuous bleed flow.

* * * * *